(No Model.) 2 Sheets—Sheet 2.
M. SMITH.
RUBBER MOLD OR PATTERN AND PROCESS OF MANUFACTURING SAME.
No. 516,028. Patented Mar. 6, 1894.
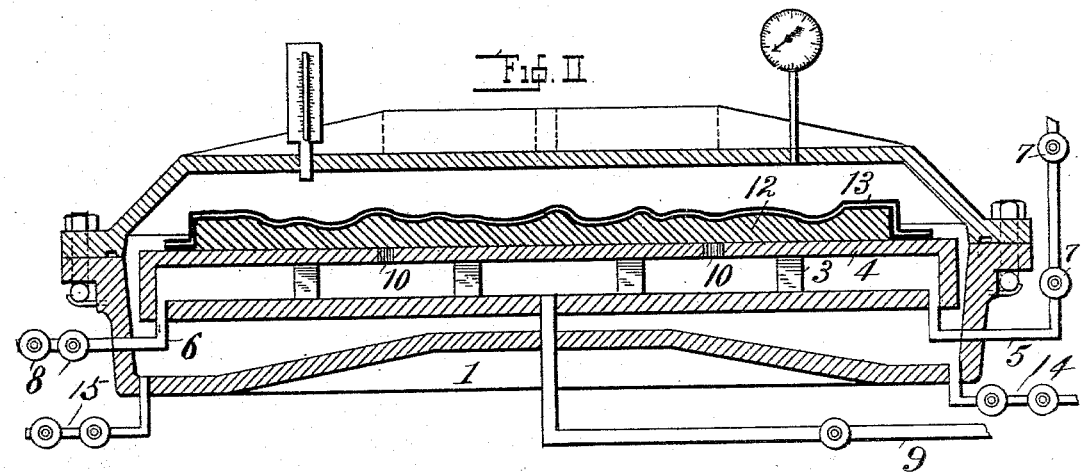
Fig. II.
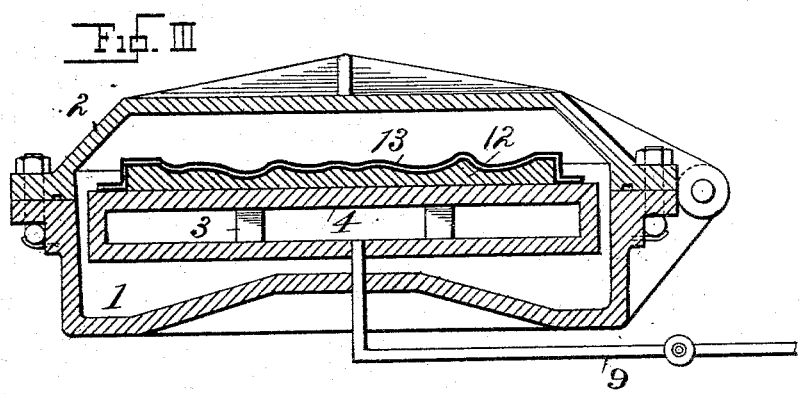
Fig. III.
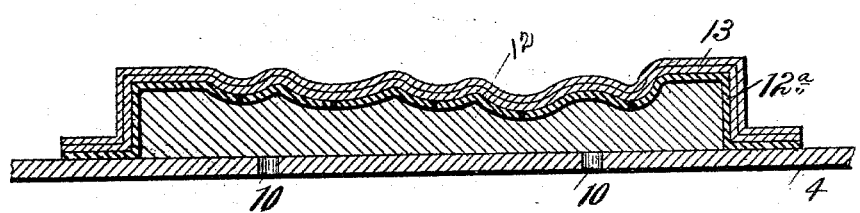
Fig. IV.
Fig. V.
Witnesses
Wm. H. Courtland
M. V. Bidgood
Inventor
Michael Smith
By Knight Bros.
Attys.

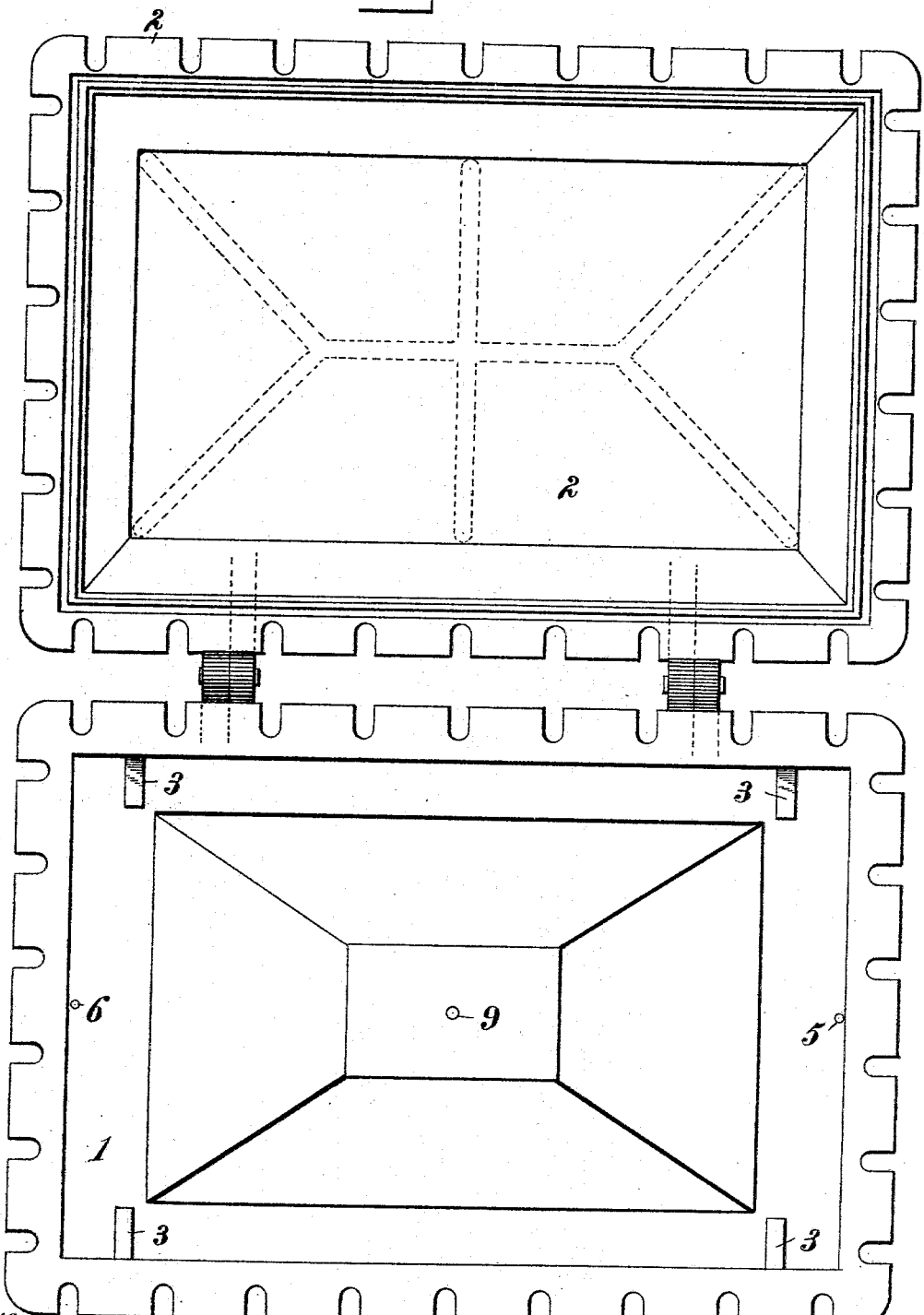

UNITED STATES PATENT OFFICE.

MICHAEL SMITH, OF PASSAIC, NEW JERSEY.

RUBBER MOLD OR PATTERN AND PROCESS OF MANUFACTURING SAME.

SPECIFICATION forming part of Letters Patent No. 516,028, dated March 6, 1894.

Application filed June 8, 1893. Serial No. 476,923. (No model.)

*To all whom it may concern:*

Be it known that I, MICHAEL SMITH, a citizen of the United States, residing at Passaic, county of Passaic, State of New Jersey, have invented certain new and useful Improvements in Rubber Molds or Patterns and Processes of Manufacturing the Same, of which the following is a specification.

The object of the present invention is the production of thin, light, elastic india rubber molds or patterns of any object. Such molds can be usefully employed in making castings of plaster of paris, wax, candy, fancy confectionery compositions or clay whether such castings are to be used themselves as ornamental objects or articles of sale or whether they are to be themselves employed as molds for the production of metallic articles by means of electro deposition or otherwise, and my process is particularly useful where such patterns or designs present deep or undercut patterns.

My present invention relates to the improved molds or patterns and to the process and apparatus for producing the same and I will, for the sake of clearness, describe herein, not only the improved molds or patterns but the apparatus I have devised for producing them, but in the present application I claim only the molds or patterns, and the process of making them reserving the apparatus for making them as the subject of claim in another application, to wit, application Serial No. 485,803, filed September 19, 1893.

Heretofore rubber molds or patterns have been made to some extent but the operation causes great labor and expense requiring three or four times the labor, care and skill that is demanded by my process and even then producing a perfect mold or pattern is only too often a failure. By the old methods it is almost impossible to produce a mold or pattern of a uniform or even thickness. This is especially the case where it is necessary that the mold or pattern should be made of a thin sheet of rubber of say, one thirty-second and one-sixteenth of an inch thick and presenting on the back and front nearly the same contour and outline and a smooth surface as well. A thin mold or pattern of nearly uniform thickness made of rubber has many great advantages and good points when it has to be used in practical manufacture especially so if deep or undercut portions of a design are presented. It may, for example, be used for casting in relief fragile materials and it may be removed from such casts easily without breaking off of projecting or prominent parts of the design.

Rubber molds or patterns have heretofore in some instances been made by pressing thick, raw, solid rubber on to a pattern or mold plate and then vulcanizing it with the result of producing molds or patterns which are solid and having a flat even surface on the back, or else, having a back which corresponds only imperfectly with the contour of the face where the follower employed has a counter design corresponding to that of the mold plate. Such molds or patterns require a great deal of rubber and being of great thickness serve the purpose for which they are intended very unsatisfactorily.

One of the methods of making a rubber mold or pattern of uneven thickness but following with some degree of closeness the contour of the original mold or model so far as the exterior surface of the rubber mold or pattern was concerned was that described in United States Letters Patent of Smith and Grasser, No. 178,479, dated June 6, 1876. In that patent a rubber mold or patern was constructed in the following manner:—A mold of copper having been first produced by electrotyping from the original model, the rubber layer is applied thereto by first putting on " small and suitable pieces of rubber cut from a thin sheet and carefully laid into all of the small cavities of the mold each being firmly pressed to the mold to which it will adhere. Care must be taken to prevent the confinement of air in any of the cavities which, if it takes place, will prevent an accurate impression. When all the cavities are filled larger pieces of rubber must be used until the whole interior surface of the mold including the inner surface of the flange is covered with a uniform thick layer. The first layer is followed by a second and third one each being laid and pressed on carefully."

As distinguished from these earlier methods my present invention involves the use of a continuous sheet of rubber for the pattern which is caused to enter all the fine details of the model to be imitated by air suction, whereas in the method followed in the Smith & Grasser invention small detached pieces of rubber are used which are carefully pressed onto the original model so as to force the air out.

For the production of my improved molds and patterns I prefer to use a specially constructed vulcanizing apparatus so that I may obtain the best results with the least labor and insure perfect success at every operation, and I have accordingly illustrated such an apparatus in the accompanying drawings it being however understood that the apparatus may be modified in some ways and still produce good results without departing from the invention.

In said drawings: Figure I is a top view of the vulcanizing apparatus, the cover being open. Figs. II and III are respectively longitudinal and transverse vertical sectional views of the same showing the cover closed and showing a rubber mold in position therein. Fig. IV is a sectional view showing modified form of the mold. Fig. V is a detail view of a screw plug.

1 is a vulcanizing vessel of any desired form having hinged cover 2 and having suitable means for closing it hermetically so as to resist heavy pressure. Within this vessel and supported on lugs 3 therein is a hollow platform 4 constructed like an ordinary steam table and having steam inlet pipe 5 and outlet pipe 6 which are preferably regulated by two sets of valves 7, 8 so as to insure perfectly against the escape of pressure. The steam pipes are to be used for heating the platform, if desired, but are not employed in the customary operation of my apparatus and in any case the water of condensation resulting from the use of the apparatus is to be drawn off through the pipe 6. The pipe 9 connected with the center of the hollow platform 4 leads to any desired means of exhausting air from the platform, for example, to an ordinary air suction pump (not shown) but capable of producing a vacuum in the platform. All the joints must be made thoroughly steam and air tight so as to prevent the escape of pressure.

On the upper surface of the platform 4 are provided any desired number of holes 10 which may be closed, when desired, by suitable valves or screws 11 (Fig. V) but which in the ordinary operation of my apparatus are open on all that part of the table which is covered by the mold, the purpose of these openings being to establish air communication between the inner surface of the mold and the hollow of the platform which connects with the air pump.

The central idea of my invention is the forming of a rubber mold or pattern of a thin sheet of rubber of uniform thickness, that is to say, with the back and front surfaces having substantially corresponding undulations, and this object I obtain by drawing a sheet of rubber on to a relief pattern by means of the vacuum created in the hollow interior of the platform 4. The mold or relief model 12 of plaster of paris, metal or other suitable substance which will resist the heat of vulcanizing without altering its shape or form, is placed on the hollow table or platform 4 and hermetically covered and closed by a rubber sheet 13 and then the creating of a vacuum within the platform 4 will cause the rubber sheet to cling to the mold and enter every fine cavity thereof. The rubber sheet intended for this operation is especially prepared and its construction forms an important part of my invention.

It is well known to workers in rubber that a sheet of raw rubber has hardly any elasticity or stretching resistance, especially when hot, and such a sheet cannot be drawn into deep cavities without tearing the sheet at the prominent points. I overcome this difficulty in the following manner: I combine two sheets, each one-sixteenth of an inch thick—one laid over the other. One of these sheets is made of rubber half vulcanized or set which has a certain elasticity or stretching quality and resistance to heat nearly as great as fully vulcanized rubber. This half vulcanized sheet I combine with a sheet of raw rubber of equal thickness, the combination being firmly effected by the use of rubber cement and by the vulcanization which takes place in forming the pattern or mold. The reason for making such a combination is this: If the entire thickness of the sheet were raw unvulcanized rubber it would tear when drawn into deep cavities which stretch the sheet greatly at such points; then when the heat for vulcanizing was applied it would render the raw rubber compounds very soft and short and the tendencies to break and tear would be greatly increased. On the other hand the half vulcanized sheet possesses a great deal of stretching, elasticity and resistance to apply heat but not so great plasticity. The two sheets together therefore form a combined sheet which has the following qualities: The raw side is perfectly plastic when hot and is laid on the object from which a mold or pattern is to be obtained. The half vulcanized side forms the back of the mold or pattern and bears up against the stretching produced by the entering of the rubber into the mold and the effect of the heat employed in vulcanization.

For the sake of illustrating my invention, I will suppose the mold 12 (whose design is to be reproduced in rubber) to be a plaster of paris reproduction of an artistic relief design or model presenting high projecting points and deeply undercut cavities. Such molds may be readily produced by those skilled in the art and the process for producing them is not therefore herein described. This mold is placed with its straight back surface on the platform 4 and all of the holes 10 of the said platform which are not covered by said mold are plugged by means of screws 11. A plaster of paris mold is very porous and by reason of such pores air communication is easily established between the mold 12 and the hollow space of the platform 4 by means of the holes 10. I now cover the top of this plaster mold with a rubber sheet 13 of the above described construction raw side down and fasten the overlapping ends of the rubber sheet to the surface of the platform all around the mold 12 by means of rubber cement so as to exclude air from access to the under surface of the mold. I now exhaust the air from the hollow platform 4 by means of an air pump and thereby abstract also the air from the pores of the plaster mold so that the atmospheric pressure on top of the rubber sheet will cause the latter to press firmly down on to the surface of the plaster of paris mold and enter every cavity thereof. The suction of the air pump is continued until the cover of the vulcanizing vessel is properly closed and fastened and additional pressure is then caused on the rubber surface of the rubber sheet by admitting steam in the vulcanizing chamber through the steam pipe 14, the valve in outlet pipe 15 being first closed. Pressure is preferably increased to about twenty pounds to the square inch and at that point keeps the rubber sheet firmly depressed into every cavity and outline of the mold. The raw side of the rubber sheet which is against the plaster of paris mold then becomes plastic under the action of heat and takes the impression of the finest outline of the mold while the said vulcanized sheet on top unites with the raw rubber beneath it and retains the shape of the mold or pattern after the vulcanization is completed. After the steam pressure has reached twenty pounds the air pump is disconnected and the pipe 9 remains open to allow free escape of gases or moisture transformed into steam which has been generated in the body of the mold by the action of heat.

It will be perceived that an important point is the arranging in a vulcanizing vessel of a platform on which a mold or relief object from which an impression is to be taken, may be placed. The platform must have connection with the air suction pump exterior of the vulcanizing vessel whereby atmospheric pressure can be made to act on the rubber as a follower to depress the same into every outline and cavity of the mold or pattern. Then the steam pressure takes up the same function while providing the required heat for vulcanization. It will be seen that no counter pressure is exerted on that side of the rubber which faces the mold or pattern because of the free outlet of gases, air or generated steam through the pipe 9 to the exterior of the vulcanizing vessel.

By my process I produce a lighter, thinner and more uniform mold or pattern of rubber with one-fourth of the labor and trouble which was necessary with former processes of producing the same.

When instead of plaster of paris, metal is employed for the pattern or mold 12 and the said pattern has deep cavities or undercut faces, I make at the deepest parts of such cavities a small hole, say, one sixty-fourth of an inch in diameter through the body of the mold or pattern. The back of the metal mold should rest on a porous slab of plaster which fits the contour of the mold. With this arrangement, the air in the cavities of the mold or pattern can escape to the air pump in substantially the same way as above described with reference to the air which fills the pores of the plaster of paris mold. Such suggested form of the invention is shown in Fig. IV where the plaster of paris backing 12 has the metallic facing 12ᵃ which forms the mold proper and on which is overlaid the two-part rubber sheet 13.

It may be sufficient with some molds to substitute for the holes 10 in the top of the platform, grooves or corrugations in the top of the platform or in the under surface of the plaster mold or pattern or on both platform and pattern which grooves extending beyond the sides of the pattern will enable the under surface of the pattern to be subjected to the action of an air exhaust pump in a manner similar to that permitted by the hole 10 in the upper surface of the platform. A mold or pattern produced by this process from a sheet of rubber, instead of from rubber in a plastic mass, is nearly of uniform thickness throughout. It is consequently of uniform flexibility and will pull off of a plaster pattern or mold readily without the injury to the overhanging or undercut portions that would occur with a mold or pattern having uneven thicknesses. It cools evenly and stretches evenly, and its back nearly corresponds to its face, so that pressure applied to its back will be evenly transmitted, through the face of the mold or pattern, to the object being molded therefrom.

Where, in the claims, I have used the term "porous" in describing a mold or pattern, I have intended the term to cover either of the forms of molds described herein, to wit, either the one having its whole body of a porous material such as plaster or the one having a facing whose deeper or undercut portions are perforated.

Having thus described my invention, the following is what I claim as new therein and desire to secure by Letters Patent:

1. A rubber mold or pattern formed of two continuous sheets of rubber united and vulcanized, substantially as set forth.

2. The process of forming a rubber mold or pattern consisting in placing a rubber sheet on the surface of the mold or pattern which is to be imitated, exhausting the air from the under surface thereof and then admitting steam under pressure to the outer surface thereof, substantially as set forth.

3. The process of making rubber molds or patterns which consists in uniting two sheets of rubber, one partially vulcanized and one of raw unvulcanized rubber, applying the said combined sheet to the mold or pattern to be imitated, the raw side against the mold or pattern, causing the sheet to take the contour of such mold or pattern and then vulcanizing, substantially as set forth.

4. In the process of making a rubber mold or pattern first applying air pressure to the surface of a rubber sheet and then substituting steam pressure therefor, substantially as set forth.

5. The process of making rubber molds or patterns consisting in applying to a porous mold or pattern to be imitated a sheet of rubber, exhausting the air from said porous mold or pattern so as to cause the rubber to enter the design thereon and then vulcanizing, substantially as set forth.

MICHAEL SMITH.

Witnesses:
J. J. C. SMITH,
EDWARD C. MOORE.